United States Patent
Tacchi et al.

(10) Patent No.: US 9,767,165 B1
(45) Date of Patent: Sep. 19, 2017

(54) SUMMARIZING COLLECTIONS OF DOCUMENTS

(71) Applicant: Quid, Inc., San Francisco, CA (US)

(72) Inventors: Ruggero Altair Tacchi, San Francisco, CA (US); Wojciech Musial, San Francisco, CA (US)

(73) Assignee: Quid, Inc., San Francisco, CA (US)

( * ) Notice: Subject to any disclaimer, the term of this patent is extended or adjusted under 35 U.S.C. 154(b) by 1 day.

(21) Appl. No.: 15/206,703

(22) Filed: Jul. 11, 2016

(51) Int. Cl.
*G06F 17/30* (2006.01)

(52) U.S. Cl.
CPC .... *G06F 17/3053* (2013.01); *G06F 17/30011* (2013.01); *G06F 17/30554* (2013.01); *G06F 17/30598* (2013.01); *G06F 17/30864* (2013.01); *G06F 17/30867* (2013.01)

(58) Field of Classification Search
CPC ......... G06F 17/30864; G06F 17/30867; G06F 17/30616; G06F 17/30598; G06F 17/30722; G06F 17/3053; G06F 17/2785; G06F 17/274; G06F 11/1435
USPC .................................. 707/748, 730
See application file for complete search history.

(56) References Cited

U.S. PATENT DOCUMENTS

| | | | |
|---|---|---|---|
| 6,925,460 B2 | 8/2005 | Kummamuru et al. | |
| 8,037,053 B2 | 10/2011 | Li et al. | |
| 8,176,418 B2 | 5/2012 | Mckeown et al. | |
| 8,713,007 B1 * | 4/2014 | Korolev et al. | 707/729 |
| 9,135,343 B2 | 9/2015 | Kirovski et al. | |
| 2002/0128821 A1 * | 9/2002 | Ehsani et al. | 704/10 |
| 2005/0096897 A1 | 5/2005 | Ando et al. | |
| 2007/0118518 A1 | 5/2007 | Wu et al. | |
| 2011/0029501 A1 * | 2/2011 | Kirovski et al. | 707/706 |
| 2011/0060983 A1 | 3/2011 | Cai et al. | |
| 2013/0311471 A1 | 11/2013 | Okajima et al. | |
| 2015/0339299 A1 * | 11/2015 | Bagchi et al. | 704/10 |

OTHER PUBLICATIONS

Peng Li et al., Document Re-ranking using Partial Social Tagging, IEEE, 2012, 274-281.*

* cited by examiner

*Primary Examiner* — Jean B Fluerantin
(74) *Attorney, Agent, or Firm* — Pillsbury Winthrop Shaw Pittman LLP

(57) ABSTRACT

Provided is a process including: obtaining a corpus having a plurality of document collections, each of which is associated with features; for a given document collection, computing a pertinence score for each feature; ranking the features based on the features' pertinence scores; selecting a first set of features based on a first coverage score thereof and a threshold; re-ranking the first set of features based on the features' relevance to the document collection; and selecting a second set of features from the first set of features based on a second coverage score thereof and the threshold, the second set of features being used for summarizing the document collection.

16 Claims, 7 Drawing Sheets

SUMMARIZING COLLECTIONS OF DOCUMENTS

BACKGROUND OF THE INVENTION

Field of the Invention

The present invention relates generally to computational linguistics and, more specifically, to summarizing collections of documents.

Description of the Related Art

Often people wish to make summaries based on information contained in, and distributed among, relatively large collections of documents, e.g., substantially more documents than they have time to read or the cognitive capacity to analyze. The main idea of summarization is to find a representative subset of the data, which contains the information of the entire set. Automatic document summarization can be implemented as the process of selecting a few representative features from amongst the many features expressed by documents in the collection. By selecting only a few representative features, summarization allows developing insights about information contained in documents without having to manually digest all of the information, which is typically more voluminous than the summary.

However, many existing document summarization techniques produce results of poor quality. For example, some techniques applied to text documents select words with highest frequencies over documents in the collection. Such techniques would likely select common words that carry little semantic information about the collection, such as "the," "and," and "or." Other techniques applied to text documents compare word frequencies among documents within the collection to frequencies outside of the collection, to select words that are over-represented within the collection. Those methods often tend to favor excessively rare words that are either highly specialized or so uncommon that their occurrence can be attributed to chance, and that, in either case, are not representative of the collection of documents at large.

BRIEF SUMMARY OF THE INVENTION

The following is a non-exhaustive listing of some aspects of the present techniques. These and other aspects are described in the following disclosure.

Some aspects include a process including: obtaining a corpus having a plurality of document collections, each of which is associated with features; for a given document collection, computing a pertinence score for each feature; ranking the features based on the features' pertinence scores; selecting a first set of features based on a first coverage score thereof and a threshold; re-ranking the first set of features based on the features' relevance to the document collection; and selecting a second set of features from the first set of features based on a second coverage score thereof and the threshold, the second set of features being used for summarizing the document collection.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
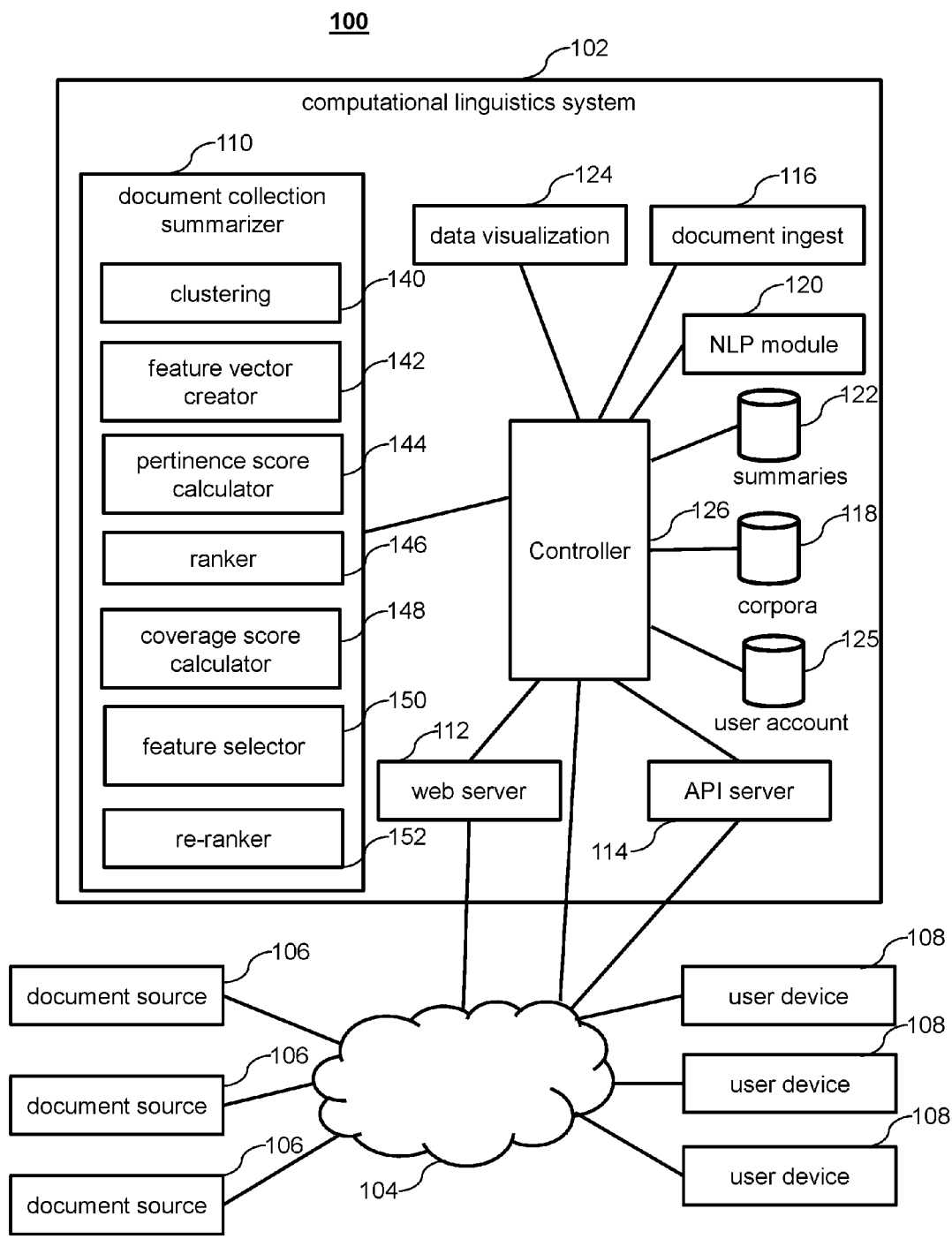
FIG. 1 is a block diagram of an example of a computational linguistics system configured to summarize collections of documents.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of natural language processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments summarize collections of documents (or other analyzed corpora). In some embodiments, the technique selects representative features for each collection in a way that prioritizes features that both are relevant for as many documents contained in the collection and are more pertinent to the given collection than to other collections. The two objectives are not easily satisfiable at once by the known methods because selecting features relevant for as many documents prioritizes the most common features, while selecting features specific to the collection prioritizes the least common features. As described below in detail, the present techniques balance these two objectives and produce summaries that allow users to digest a large scale of data with relatively small effort.

The "documents" referred herein are understood in a general sense, and include and are not limited to text documents such as articles, patents, research publications, or other bodies of unstructured text. The documents may be organized in collections in an analyzed corpus, whereby any one document may belong to one or more collections. In some embodiments, the corpus may have more than 1,000 documents with a median word length of more than 500 words. The organization of documents in the collections may reflect certain latent information: the collections may reflect topics in the case of text documents, classification codes, or any other categorical data associated with documents. Each of the documents may be described by features (attributes) that represent information contained within the document or information otherwise specific to the document, such as individual words or combination of words (n-grams) that occur in a text document, topic keywords that describe the content of a document, document classification codes, or a combination thereof. The totality of such features relevant to a document, together with the features count, is referred to as the document's feature vector.

FIG. 1 illustrates, in block diagram form, the logical architecture of an example of a computing environment 100 in which the present techniques may be implemented. In some embodiments, environment 100 includes a computational linguistics system 102, the Internet 104, document sources 106, and a plurality of user devices 108, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may submit queries to the computational linguistics system 102 (which may be geographically remote) via a web browser executing on user devices 108 and exchanges over the Internet 104. In some embodiments, users may submit queries to view summaries of document collections determined by the computational linguistics system 102. These documents, in some cases, may be retrieved (e.g., downloaded) from content hosted by third party document sources 106, in some cases as batch downloads in advance of queries.

In some embodiments, the computational linguistics system 102 may include a document collection summarizer 110 to perform the present techniques, a web server 112, an application-program interface (API) server 114, a document ingest module 116, a corpora repository 118, a natural-language processing (NLP) module 120, a summary repository 122, a data visualization module 124, a user account repository 125, and a controller 126. The controller 126 may coordinate the described operations of the other modules. In some cases, prior to granting access, the controller 126 may confirm a user's credentials against a user account in the user account repository 125 for security purposes and to verify whether a user account is current, e.g., a subscription fee has been paid.

In some embodiments, the document collection summarizer 110 may execute the processes 200, 300, 400, 500, and 600 of FIGS. 2-6 described below in detail. In some embodiments, the document collection summarizer 110 may include a clustering module 140, a feature vector creator 142, a pertinence score calculator 144, a ranker 146, a coverage score calculator 148, a feature selector 150, and a re-ranker 152.

In some embodiments, the clustering module 140 may cluster each document in the analyzed corpus (e.g., retrieved from one or more of the document sources 106) into a plurality of document collections.

In some cases, an analyzed corpus may be relatively large, for example, more than 100 documents, more than 1,000 documents, or more than 10,000 documents, and the number of document collections after clustering may be relatively numerous, e.g., more than 5 document collections, more than 50, or more than 500. In some embodiments, each of the documents may also include a substantial amount of text, for instance, more than 100 words, more than 500 words, or more than 2,000 words. In one example, the median word length of a document is more than 500 words.

The clustering module 140 may cluster the documents into document collections, e.g., based on semantic similarity determined using distributional semantic analysis. In some cases, a graph of documents may be formed before clustering, like a semantic similarity graph. In some embodiments, the nodes of the graph may represent documents, and the edges of the graph may represent the pairwise semantic similarity of the nodes. In some embodiments, the semantic similarity may be generated with latent semantic analysis. In some cases, a feature vector for each document may be calculated, with the scalars of the feature vector corresponding to n-grams (e.g., one word or pairs of words or three word sequences, or the like), and values of the scalars representing the number of times the n-gram occurs in the document. In some cases, the similarity scores may be based on the angles between the vectors.

In some embodiments, the semantic similarity graph may be clustered. In one example, Louvain method for community detection, or other greedy optimization clustering algorithm, may be applied by the clustering module 140. In some embodiments, the organization of documents in the collections may reflect certain latent information. The collections may reflect topics in the case of text documents, classification codes, or any other categorical data associated with documents. For example, each document collection may be associated with a particular topic (e.g., NBA, 2016 Presidential Election), a particular document source (e.g., CNN, ESPN), a particular user (e.g., webpages visited by a user, comments posted by a user), and/or a particular time frame.

In some embodiments, the feature vector creator 142 may calculate a feature vector for each document in the analyzed corpus, or the feature vector described above to establish a graph may be used. A feature vector may be a multi-dimensional vector of numerical features, including for example, a plurality of n-grams in the text of the document, a topic keyword describing content of the document, a document classification code, or a combination thereof, each of which is considered as a feature or an attribute of the document. In some embodiments, the totality of features relevant to a document, together with the numerical values of each feature (e.g., a frequency, a count, or a ratio of the feature with respect to the document), is referred to as the document's feature vector. The feature vector creator 142 may apply various suitable feature extraction and dimensionality reduction algorithms to generate feature vectors. For example, linear discriminant analysis, latent dirichlet allocation, principle component analysis, minimum classification error training algorithm, and support vector machine algorithm may be used by the feature vector creator 142 for feature extraction. Or in some embodiments, a bag-of-words model may be used, with vectors corresponding to n-grams. Moreover, as each document may be associated with a feature vector having multiple features, each document collection may be associated with a plurality of features obtained from documents in the document collection. In some embodiments, the documents may be clustered based on their feature vectors. In some embodiments, each cluster may constitute a document collection to be summarized.

In some embodiments, the graph-formation, clustering, and scoring techniques described herein may entail performing matrix operations on relatively large numbers of vectors, e.g., in relatively large, sparse matrices, where columns represent vectors and rows indicate the occurrence of a respective n-gram in a document. Often (and typically) such data structures are too large to reside in higher levels of cache memory, while portions of the structures may be accessed frequently in certain operations, like matrix multiplication. To reduce the time spent moving data up and down a memory hierarchy, some embodiments may perform these matrix operations with the sparse matrix and blocking techniques described below.

In some embodiments, the pertinence score calculator 144 may calculate a pertinence score for each document feature. The pertinence score may be indicative of the pertinence of the respective feature to the given document collection relative to other document collections in the corpus. As described above, in some embodiments, the pertinence score relates to one objective of some aspects of the present techniques, i.e., selecting features more specific to the given document collection than to other document collections, and that prioritizes the least common features. In one example, the term-frequency inverse-document-frequency (TFIDF) metric may be applied by the pertinence score calculator 144 at the document collection level rather than the document level to calculate the pertinence scores for each document feature. TFIDF should be understood to encompass variants thereon, including BM25 and the like. The TFIDF-based pertinence score may increase proportionally (or non-linearly, like in BM25, with the marginal effect of higher counts decreasing) to the number of times of a feature (e.g., an n-gram) occurs in the given document collection, but be divided by the frequency with which the feature occurs in the corpus (i.e., other document collections in the corpus or in a larger corpus). In one example, the TFIDF-based pertinence score may be composed by two terms: the first computes the frequency in which the feature occurs in the given document collection, and the second computes the frequency in which the feature occurs in other document collections in the corpus. The TFIDF-based pertinence score then may be calculated as the product of the first frequency times of the logarithm of the inverse of the second frequency. Or various other pertinence score metrics may be used to indicate the pertinence of a feature to the given document collection relative to other document collections in the corpus.

In some embodiments, the ranker 146 may rank all document features of the given document collection based on their pertinence scores. In one example, the higher pertinence score a feature has, the more pertinent the feature is to the given document collection relative to other document collections in the corpus. In this example, the features may be sorted in the decreasing order, i.e., the top-ranked feature has the highest pertinence score.

In some embodiments, the coverage score calculator 148 may calculate a coverage score for a set of document features. In some embodiments, the coverage score is indicative of coverage of documents in which the set of features occur among the documents in the given document collection. The set of document features may include any number of features, e.g., from one feature to all features of the given document collection. In some embodiments, the set of features may have n features with consecutive highest pertinence scores, where n is a natural number. In one example, the coverage score may be calculated as the percentage (or ratio) of the number of documents in which the set of features occur relative to the total number of documents in the given document collection. As described above, the coverage score is expected to prioritize features that are relevant to as many documents contained in the collection (i.e., the most common features). In some embodiments, the coverage score (and the pertinence scores) may be based on a sampled set of the documents in a collection (e.g., a randomly selected sample) to expedite processing, or the scores may be based on all documents in the collection.

In some embodiments, the feature selector 150 may select a set of features from the ranked features. As mentioned above, the coverage score calculator 148 may calculate a coverage score for a set of features, such as the features with n consecutive highest pertinence scores. A threshold coverage score may be predefined (or defined dynamically) and provided to the feature selector 150 for selecting the set of features based on their coverage scores, e.g., those above the threshold. In one example, sub lists of consecutive highest pertinence-scoring features may be checked by the feature selector 150 in the order of the sub list (e.g., starting from 1). The first sub list with its coverage score above the threshold (i.e., the set of features with the minimum number of features therein) may be selected by the feature selector 150 as the selected set of features. In other words, for a given set of features with n consecutive highest pertinence scores, where n is a natural number, the feature selector 150 may compare its coverage score against the threshold. If the coverage score is above the threshold, then in response, the feature selector 150 may select the given set of features as the selected set of features. Otherwise, another feature with the (n+1)th highest pertinence score may be added into the given set of features, and the feature selector 150 compares the coverage score of the features with n+1 consecutive highest pertinence scores against the threshold. The process is repeated until the feature selector 150 identifies the set of features with the minimum number of features while its coverage score is above the threshold.

In some embodiments, the re-ranker 152 may re-rank the set of features selected by the feature selector 150. The re-ranker 152 may re-rank the selected set of features based on their relevance to the given document collection. In one example, a pair of features in the selected set of features may be checked by the re-ranker 152 and their positions (rankings) may be swapped if desirable. The swapping of positions of the two features may be considered desirable if the coverage score of features between the top-ranked feature and the higher ranked feature of the two features is smaller than the coverage score of those same features but with the lower ranked feature of the two features in place of the higher ranked feature of the two features. For example, assuming the first feature of the pair of features is ranked higher than the second feature of the pair of features, the re-ranker 152 may swap rankings of the first and second features if it determines that the coverage score for a set of selected features including the first features and other selected features with consecutive highest pertinence score higher than the first feature is smaller than the coverage score for another set of selected features including the second feature and the other selected features with consecutive highest pertinence scores higher than the first feature. The set of selected features may be checked by the re-ranker 152 for the swapping possibility in iterated passes, whereby in a single pass each pair of two consecutive features is checked in the order as they appear in the ranking. The swapping check may be stopped when no swaps have been performed by the re-ranker 152 in the previous pass.

In some embodiments, the feature selector 150 may re-select a set of features from the re-ranked features, at least in part, by determining a coverage score for the re-selected set of features above a threshold coverage score. That is, the re-ranked features may be truncated at a minimal count whose coverage score is above the threshold. In one example, the threshold coverage score may be the same as the one used before for selecting the set of features from the ranked features. The same algorithm used by the feature selector 150 described above for selecting the set of features may be used for re-selecting from the re-ranked features. The re-selected features may be the output of the document collection summarizer 110 and used for summarizing the document collection. In some embodiments, results may be stored in memory, e.g., in the summary repository 122 in association with the corresponding document collection, or results may be transmitted to a user device 108 for display in a web browser, e.g., in response to a query for summary of the document collection.

Other components may assist an analyst seeking related insights from large numbers of documents, including insights derived from the summaries prepared with the techniques above. For instance, in some cases, a graphical representation of the clusters of documents in the graph may be sent to a user with the summary presented in association with each cluster, e.g., the summary terms may be revealed upon a user mousing over, clicking, touching, or otherwise selecting a given cluster (i.e., a document collection within the corpus represented by the graph). In some cases, the graph may be displayed in a force directed layout using the techniques described below.

To these ends and others, in some embodiments, the computational linguistics system 102 may include the web server 112 and API server 114. These servers may listen to corresponding network ports, maintain session state for various sessions with user devices 108, advance requests and posted data to controller 126, and send responsive data to user devices 108. In some cases, responses may be in the form of web pages, like serialized bodies of markup language, cascading style sheets, and JavaScript™ instructions used by web browsers to render content, like inputs for making requests or data visualizations of query responses. In some embodiments, the API server 114 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferrers or promises.

In some embodiments, the document ingest module 116 may obtain collections of documents and store those documents in corpora repository 118, which may have analyzed corpora of unstructured plain text documents used to generate the presently described summaries. In some embodiments, the documents may be obtained from different document sources 106, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing document features is unstructured text, like human readable plain text in prose form with markup instructions and scripting language instructions removed. For instance, an automated web browser, like Selenium™, may be executed to retrieve web pages, execute scripts to and render markup language construct a document object model of the webpages, and parse visible text from the web pages that is retrievable from ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyzed documents according to their mode of construction or to weight terms according to their visual weight when rendered or annotate terms according to their context. In some embodiments, the text may be encoded as Unicode or ASCII text.

In some embodiments, an analyzed corpus may be relatively large. For expected use cases of the present inventions, the corpus is larger than would be economically feasible for humans to manually perform the processes 200, 300, 400, 500, and 600 in reasonable amounts of time, and computers are required to implement the processes 200, 300, 400, 500, and 600 in commercially relevant intended applications. In some cases, an analyzed corpus may be relatively large, for example, more than 100 documents, more than 1,000 documents, or more than 10,000 documents. In some embodiments, each of the documents may also include a substantial amount of text, for instance, more than 100 words, more than 500 words, or more than 2,000 words.

The necessity of computer implementation, even for relatively small corpora, can arise from the number of documents, the length of documents, or the semantic pairwise interrelationships between the documents, which can give rise to data structures that can grow factorially with each additional document depending upon how aggressively semantic links between documents are pruned. Due to this scaling effect, each additional document in some applications can impose substantial additional computational and memory burdens, and increasing the number of documents even by a small amount can be a nontrivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, like scientific literature, medical literature, economic literature, psychological-research literature, and the like, for instance, from a given journal, university, country, or academic. Other examples include webpages, for example, from businesses, like the 500 highest ranking business entity web sites responsive to a given query, businesses within a given region, businesses in a given industry, businesses at a given state of development (like emerging businesses), or combinations thereof, like startups in Silicon Valley targeting the shipping industry to give one example. Other examples of corpora include documents hosted in government databases, like the full text patent database hosted by the United States Patent Office, regulatory filings with the Securities and Exchange Commission hosted in the Edgar database, court filings within the Pacer database, Federal Communication Commission filings, United States Food and Drug Administration filings, and the like. Another example of corpora includes various bodies of journalism, like catalogs of newspapers, magazines, and the like. Relevant corpora also include social media posts, for example, microblog posts, blog posts, posts within social networks, and the like, as well as resumes, job postings, and product manuals.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco Calif., or by performing latent semantic analysis or other distributional semantic techniques to summarize document collections described herein. In some cases, the analysis may be performed by an unsupervised machine learning technique, or some embodiments may train supervised machine learning models (e.g., with stochastic gradient descent) based on a training set, like text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, the NLP module 120 may analyze these corpora to provide features vectors for each document. In some embodiments, each document may be represented by a feature vector in which each value of the vector indicates the presence, number of occurrences, or frequency of an n-gram in the document. N-grams are sequences of one or more terms, e.g., "the" is an example of an n-gram where n=1, "the quick" is another n-gram where n=2, and "the quick brown fox jumped" is another where n=5. In some cases, relatively uninformative terms, like stop words ("the," "a," and "an" being common examples), or terms detected with TFIDF scoring may be omitted.

To calculate TFIDF for a given n-gram, some embodiments may count the number of times the n-gram occurs within a given document and the number of other n-grams in the document before calculating a frequency with which the term occurs within the document. Some embodiments may also count the number of times the n-gram occurs in a larger collection of documents, such as the analyzed corpus of a sampling thereof, as well as the total number of terms in the larger collection of documents to calculate another frequency with which the term appears in the larger collection of documents. The two resulting frequencies may be compared, for instance, dividing one frequency by the other, to determine the TFIDF score.

Position of a value in the feature vector may correspond to one n-gram, e.g., the first position of a vector may correspond to the n-gram "jumped over," and documents containing this sequence of terms have a feature vector with value in the first position indicating that this term is present. Documents many be analyzed as a whole, or at higher resolution. For instance, in some embodiments, each document may be partitioned into paragraphs, and then a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Because the universe of n-grams a document could contain is relatively large, and documents tend to use a relatively small portion of these n-grams, feature vectors tend to be relatively high-dimensional and sparse, having a value of zero for most values. To mitigate the burden of high-dimensionality, in some cases, feature vectors may be subjected by some embodiments to various types of dimensional reduction, like indexing, random indexing, or singular value decomposition.

In some cases, a corpus may be represented by arranging the feature vectors into a term-document matrix. For instance, each row or column may correspond to a document, and the values along the row or column may be the feature vector of that document. Thus, rows may represent documents, and columns n-gams, or vice versa.

Or in some embodiments, a document or corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entities mentioned in documents, sentiments expressed in documents, or terminology in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for larger datasets. A number of techniques may be used to expedite these operations and reduce memory consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cash memory to these ends.

In some cases, some of the sparse-matrices described above may consume a relatively large amount of memory using some traditional techniques. To conserve memory, some embodiments may compress the sparse matrices, for example, by decomposing a matrix into vectors, and translating the vectors into an index indicating which vector scalars have a nonzero value and corresponding indications of those values. Some embodiments may compress such vectors with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as eight, 16, or 32 bit binary values having a number of digits selected in view of an operating system, register size, memory bust size, and other hardware constraints of a computer system upon which the above processes are to be run to expedite operations and conserve memory.

Some embodiments may determine document similarity based on latent semantic analysis of unstructured text in the documents. For instance, some embodiments may create a term document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing with more than a threshold frequency in the documents may be determined and weighted according to TFIDF. In some cases, the resulting weighted term document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (like within a threshold number of words in the text), or vice versa, and values represent presence, number, or frequency of instances in which corresponding terms are determined to be adjacent one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or −1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vector may be determined for documents in a corpus. Some embodiments may execute a density-based clustering algorithm, like DBSCAN, to establish groups corresponding to the resulting clusters and exclude outliers. To cluster according to vectors, some embodiments may iterate through each of the vectors reflected in the records and designate a vector as a core location in vector space if at least a threshold number of the other vectors in the records are within a threshold distance in vector space. Some embodiments may then iterate through each of the vectors and create a graph of reachable vectors, where nodes on the graph are identified in response to non-core corresponding vectors being within a threshold distance of a core vector in the graph, and in response to a core vector in the graph being reachable by other core vectors in the graph, where the vectors are reachable from one another if there is a path from one vector to the other vector where every link and the path is a core vector and it is within a threshold distance of one another. The set of nodes in each resulting graph, in some embodiments, may be designated as a cluster, and points excluded from the graphs may be designated as outliers that do not correspond to clusters.

In some cases, when performing these operations, movements within a memory hierarchy of a computer system (e.g., from storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive, may extend this trade-off even further. In some embodiments, matrices may be large enough that during operation substantial portions of the matrix, for example, most of the matrix, cannot fit into the higher levels of a memory hierarchy, and portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level of the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy. For example, the higher and lower levels may be level 2 cache and dynamic random access memory, respectively, or level 2 cache and level 3 cache, respectively. In some cases, multiple levels of tiling may be performed, e.g., a tile loaded into cache may be sub-divided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

In some embodiments, the data visualization module 124 may be operative to prepare data visualizations for display on user devices 108, e.g., visualizations of the summaries described herein. In some cases, such visualizations may include a list of ordered re-selected features on the display. In some cases, graph generation and visualization preparation takes place on the computational linguistics system 102, and resulting interactive visualizations run (e.g., entirely) in a web browser of a user device 108. In some cases, this entails displaying and manipulating thousands of features for a large number of document collections in an environment on user devices 108 not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

In some embodiments, many (and in some cases, most) queries are expected to return relatively large collections of documents. This is the intended use case of some embodiments, which is distinct from many online search engines designed to return the most relevant document. In view of this distinction, some embodiments process the results and provide graphical user interfaces that facilitate insights on collections of responsive documents, rather than merely directing the user to individual documents. In many cases, users are more interested in what an entire field has to say about a particular topic, rather than finding, for instance, the most relevant individual document about some topic. Many traditional search engines are not well-suited for this type of analysis, as it is common for search engines to emphasize individual responsive documents rather than attempt to provide some synthesis of the collection of responsive documents. In contrast, some embodiments consistent with the present techniques may both help the user find the needle in the haystack, as well as develop an understanding of the haystack itself.

Figure 2:
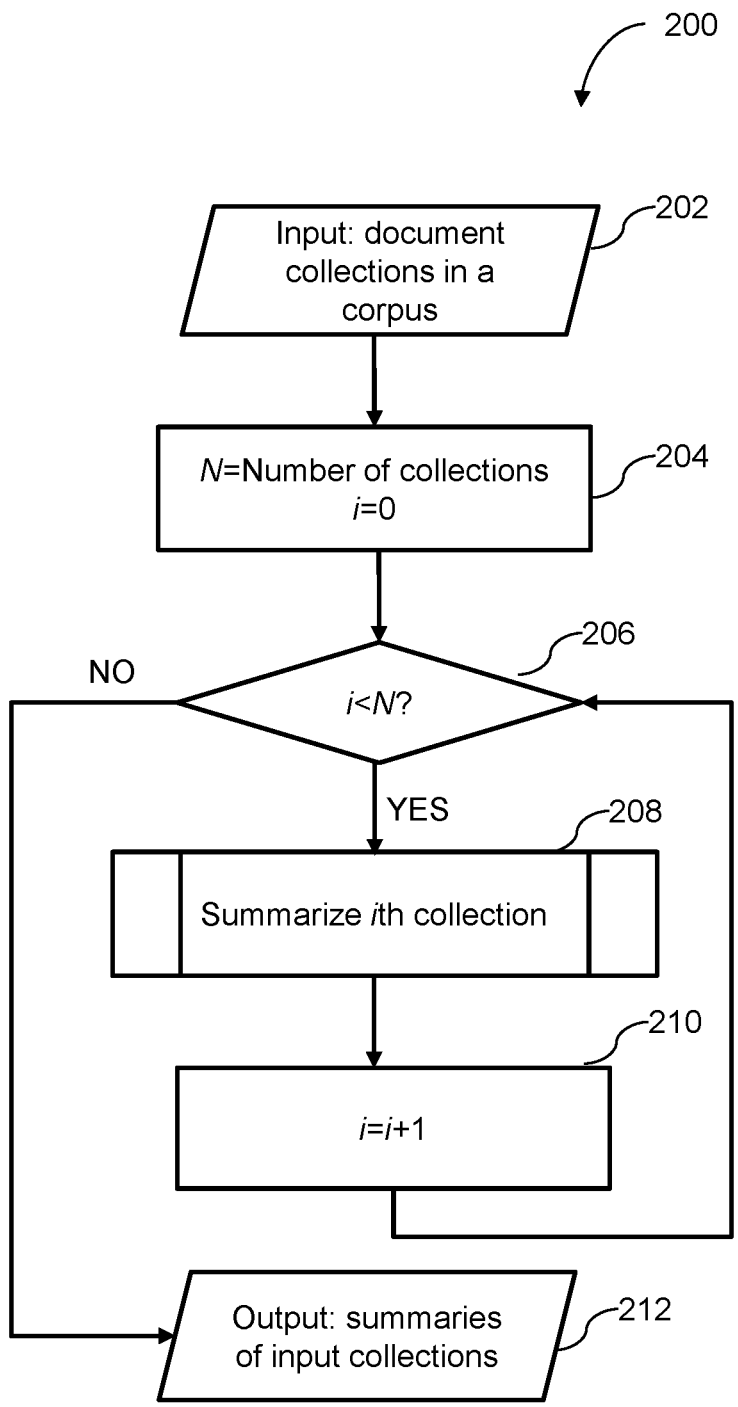
FIG. 2 is a flow chart of an example of a process of summarizing collections of documents.

FIG. 2 is a flow chart of an example of a process 200 of summarizing collections of documents in accordance with some embodiments of the present techniques. The process 200, in some cases, is performed by the above-described document collection summarizer 110, but embodiments are not limited to this particular implementation. The input 202 of the process 200 in this embodiment includes N document collections in an analyzed corpus. In this embodiment, the initial value of a counter i is set as 0 at block 204 and is compared with the value of N at block 206. If i<N, i.e., at least one document collection has not been summarized, then the process 200 continues to block 208 where the ith document collection is summarized, e.g., by performing process 300 described below with reference to FIG. 3. Next, at block 210, the value of the counter i is increased to i+1, and the next document collection is summarized. Once all the document collections in the corpus are summarized, i.e., i=N at block 206, the output 212 of the process 200, including the summaries of each input document collection in the corpus, is provided. In some cases, the loop beginning at block 206 may be executed multiple times concurrently on multiple threads or computing devices, with each thread or computing device summarizing a different collection.

Figure 3:
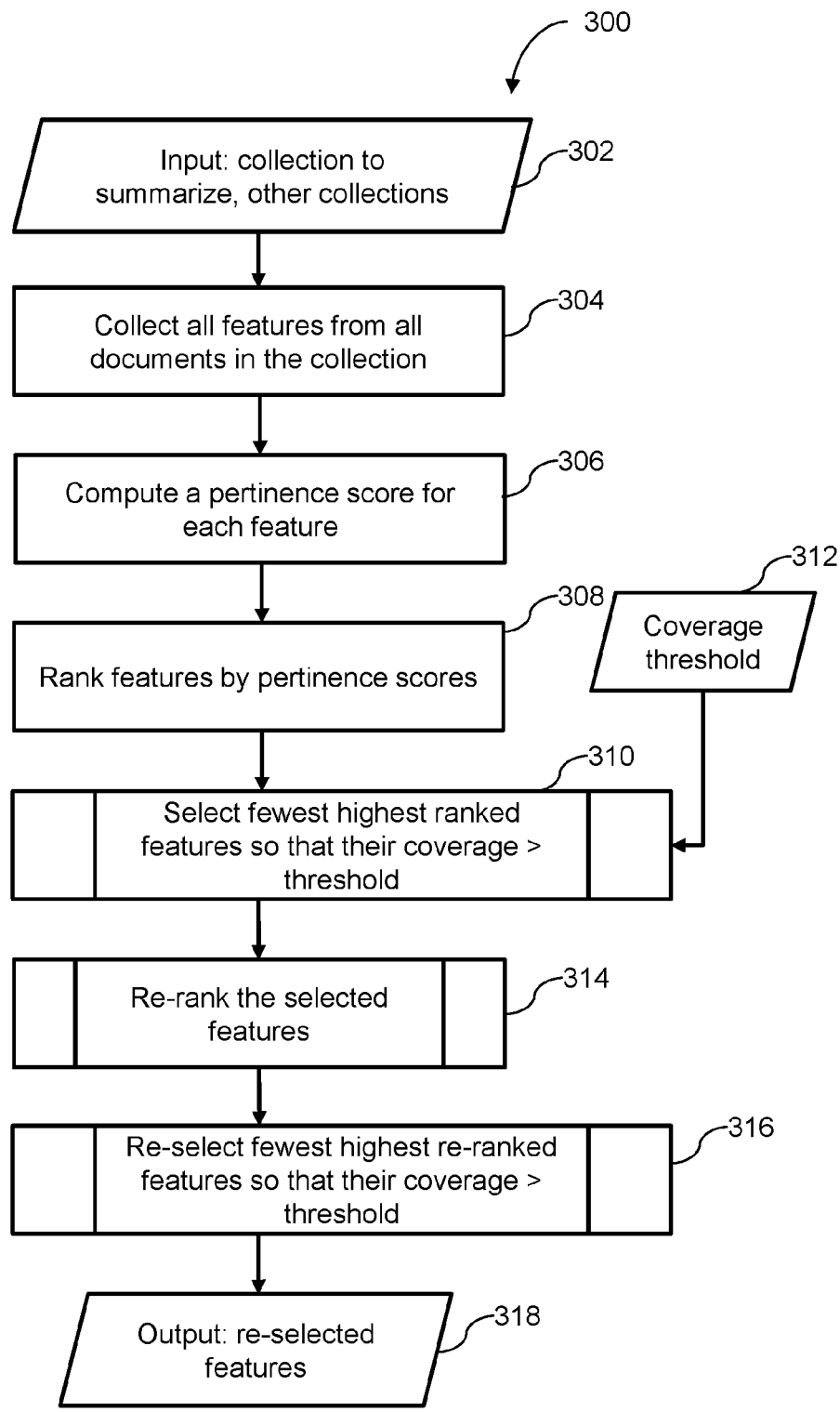
FIG. 3 is a flow chart of an example of a process of summarizing a collection of documents.

FIG. 3 is a flow chart of an example of a process 300 of summarizing a collection of documents in accordance with some embodiments of the present techniques. The process 300, in some cases, is performed by the above-described document collection summarizer 110, but embodiments are not limited to this particular implementation. The input 302 of the process 300, in this embodiment, includes a given document collection to be summarized, and other document collections in the same analyzed corpus. The process 300, in this embodiment, includes collecting all features from all documents in the given document collection, as indicated by block 304. This may be performed, for example, by the feature vector creator 142. Next, the process 300, in this embodiment, includes computing a pertinence score for each feature, as indicated by block 306. This may be performed, for example, by the pertinence score calculator 144. Next, the process 300, in this embodiment, includes ranking features by their pertinence scores, as indicated by block 308. This may be performed, for example, by the ranker 146. Next, the process 300, in this embodiment, includes selecting the fewest highest ranked features so that their coverage score is larger than a predefined coverage threshold 312, as indicated by block 310. This may be performed, for example, by the feature selector 150. Next, the process 300, in this embodiment, includes re-ranking the selected features, as indicated by block 314. This may be performed, for example, by the re-ranker 152. Next, the process 300, in this embodiment, includes re-selecting the fewest highest re-ranked features so that their coverage score is larger than the coverage threshold 312, as indicated by block 316. This may be performed, for example, by the feature selector 150. Eventually, the output 318 of the process 300, including the re-selected features, is provided.

Figure 4:
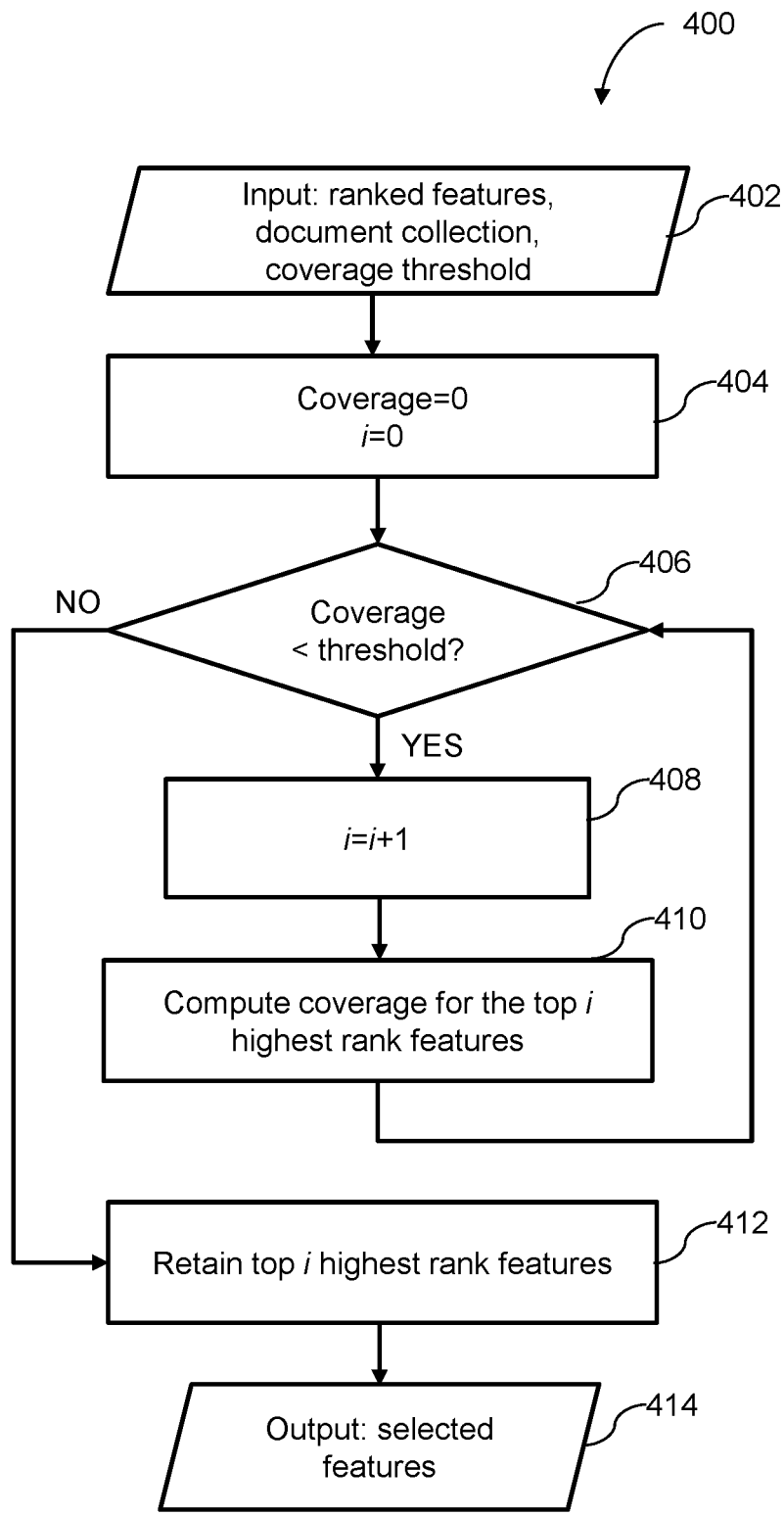
FIG. 4 is a flow chart of an example of a process of selecting features of a collection of documents based on pertinence scores and coverage scores.

FIG. 4 is a flow chart of an example of a process 400 of selecting features of a collection of documents based on pertinence scores and coverage scores in accordance with one embodiment of the present technique. The process 400, in some cases, is performed by the above-described coverage score calculator 148 and the feature selector 150, but embodiments are not limited to this particular implementation. The input 402 of the process 400, in this embodiment, includes a given document collection to be summarized, features of the given document collection which have been ranked based on their pertinence scores, and a predefined coverage threshold. An initial value of 0 is assigned to the coverage score and a counter i at block 404. At block 406, it is checked whether the coverage score is smaller than the threshold. If the answer of block 406 is YES, then the process 400 proceeds to block 408 where the value of i is increased by 1. Next, at block 410, the coverage score for the top i highest ranked features is computed. Next, the process 400, in this embodiment, returns to block 406 to check again if the updated coverage score is still smaller than the threshold. If the updated coverage score becomes the same as the threshold or larger than the threshold, the process 400 continues to block 412 where the top i highest ranked features are retained as the selected features and are outputted at block 414. Otherwise, the process 400 continues to compute the coverage score for the top i+1 highest ranked features until the fewest highest ranked features whose coverage score is not smaller than the threshold are found.

Figure 5:
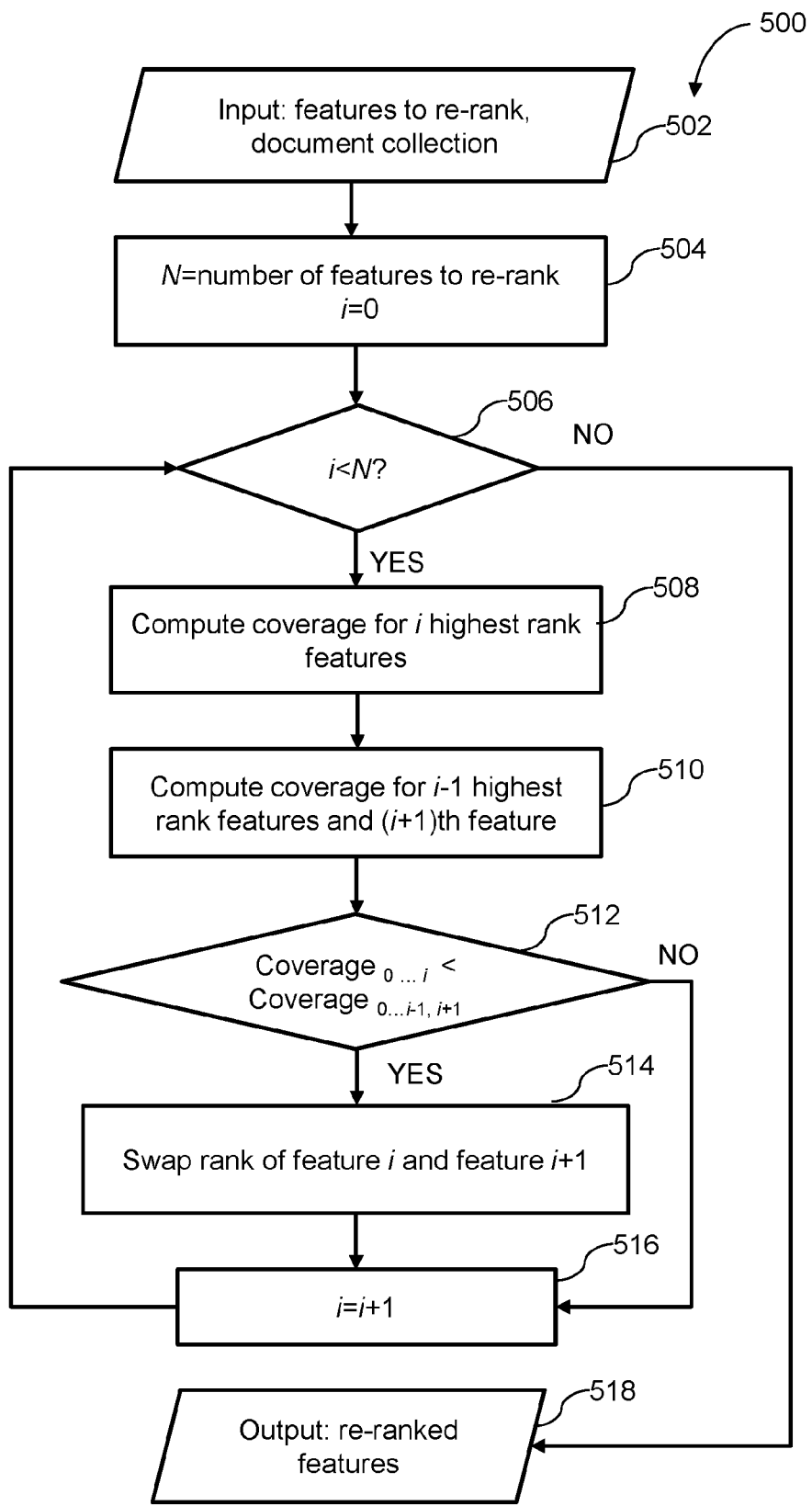
FIG. 5 is a flow chart of an example of a process of re-ranking selected features of a collection of documents based on coverage scores.

FIG. 5 is a flow chart of an example of a process 500 of re-ranking selected features of a collection of documents based on coverage scores in accordance with one embodiment of the present technique. The process 500, in some cases, is performed by the above-described re-ranker 152, but embodiments are not limited to this particular implementation. The input 502 of the process 500, in this embodiment, includes a given document collection to be summarized and N selected features to be re-ranked. In this embodiment, an initial value of a counter i is set as 0 at block 504 and then is compared with the value of N at block 506. If i<N, i.e., at least one feature has not been re-ranked, then the process 500 continues to block 508 where the coverage score for the i highest ranked features is computed. Next, the process 500, in this embodiment, includes computing the coverage score for a set of features including the i−1 highest ranked features and the (i+1)th feature, as indicated by block 510. At block 512, the coverage score computed at block 508 is compared with the coverage score computed at block 510 to see if the former coverage score is smaller than the latter coverage score. If the answer of block 512 is YES, then the process 500 proceeds to block 514 where rank of feature i and feature i+1 is swapped. The counter i is increased by 1 at block 516 so that the next pair of features can be checked to see if their positions in the ranking shall be swapped. The re-ranked features are provided as the output 518 of the process 500.

Figure 6:
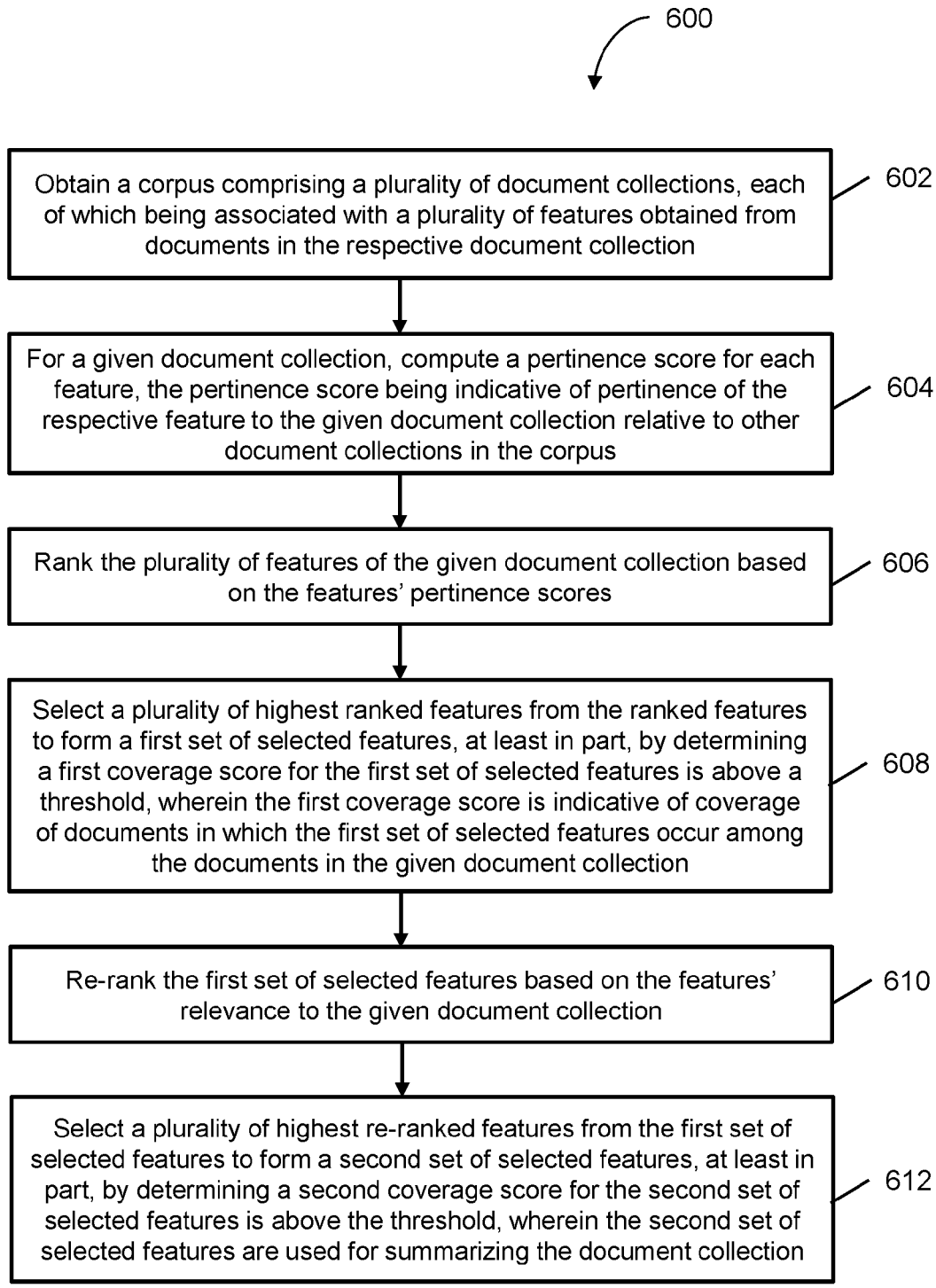
FIG. 6 is a flow chart of another example of a process of summarizing a collection of documents.

FIG. 6 is a flow chart of another example of a process 600 of summarizing a collection of documents in accordance with one embodiment of the present technique. The process 600, in some cases, is performed by the above-described document collection summarizer 110, but embodiments are not limited to this particular implementation. The process 600 may be encoded in a tangible, non-transitory, machine-readable medium, and those instructions, when executed by a data processing apparatus, may cause the data processing apparatus to effectuate the presently described operations.

The process 600, in this embodiment, includes obtaining a corpus comprising a plurality of document collections, as indicated by block 602. Each of the document collections may be associated with a plurality of features obtained from documents in the respective document collection. In some embodiments, each document in the corpus may be retrieved and a feature vector for each document may be generated. The feature vector may include a plurality of n-grams in text of the document, a topic keyword describing content of the document, a document classification code, or a combination thereof. The retrieved documents may be clustered into the plurality of document collections.

Next, for a given document collection among the plurality of document collections, the process 600, in this embodiment, includes computing a pertinence score for each of the plurality of features of the given document collection, as indicated by block 604. The pertinence score may be indicative of pertinence of the respective feature to the given document collection relative to other document collections in the corpus. In some embodiments, the pertinence score for each feature may be computed by computing a first frequency in which the feature occurs in the given document collection, a second in which the feature occurs in the other document collections in the corpus, and a product of the first frequency times the logarithm of the inverse of the second frequency.

Next, the process 600, in this embodiment, includes ranking the plurality of features of the given document collection based on the features' pertinence scores, as indicated by block 606. Next, the process 600, in this embodiment, includes selecting a plurality of highest ranked features from the ranked plurality of features of the given document collection to form a first set of selected features, as indicated by block 608. The first set of selected features may be selected, at least in part, by determining a first coverage score for the first set of selected features is above a threshold. The first coverage score may be indicative of coverage of documents in which the first set of selected features occur among the documents in the given document collection. In some embodiments, for a given set of features with n consecutive highest pertinence scores, where n is a natural number, an amount of the number of documents in which the given set of features occur relative to the number of the documents in the given document collection may be computed. In response to determining the amount is above the threshold, the given set of features may be selected. Otherwise, the given set of features may be updated by adding another feature with the (n+1)th highest pertinence score, and the computing and determining operations may be repeated.

Next, the process 600, in this embodiment, includes re-ranking the first set of selected features based on the features' relevance to the given document collection, as indicated by block 610. In some embodiments, rankings of first and second selected features may be swapped in response to determining that a third coverage score for a third set of selected features including the first selected feature is smaller than a fourth coverage score for a fourth set of selected features including the second selected feature. The first selected feature is ranked higher than the second selected feature. The third set of selected features includes the first selected feature and one or more selected features with consecutive highest pertinence scores higher than the pertinence score of the first selected feature, and the fourth set of selected features includes the second selected feature and the one or more selected features with consecutive highest pertinence scores higher than the pertinence score of the first selected feature. In some embodiments, the swapping operation may be repeated for each pair of selected features ranked consecutively.

Next, the process 600, in this embodiment, includes selecting a plurality of highest re-ranked features from the first set of selected features to form a second set of selected features, as indicated by block 612. The second set of selected features may be selected, at least in part, by determining a second coverage score for the second set of selected features is above the threshold. The second coverage score may be indicative of coverage of documents in which the second set of selected features occur among the documents in the given document collection. The second set of selected features may be used for summarizing the document collection.

Figure 7:
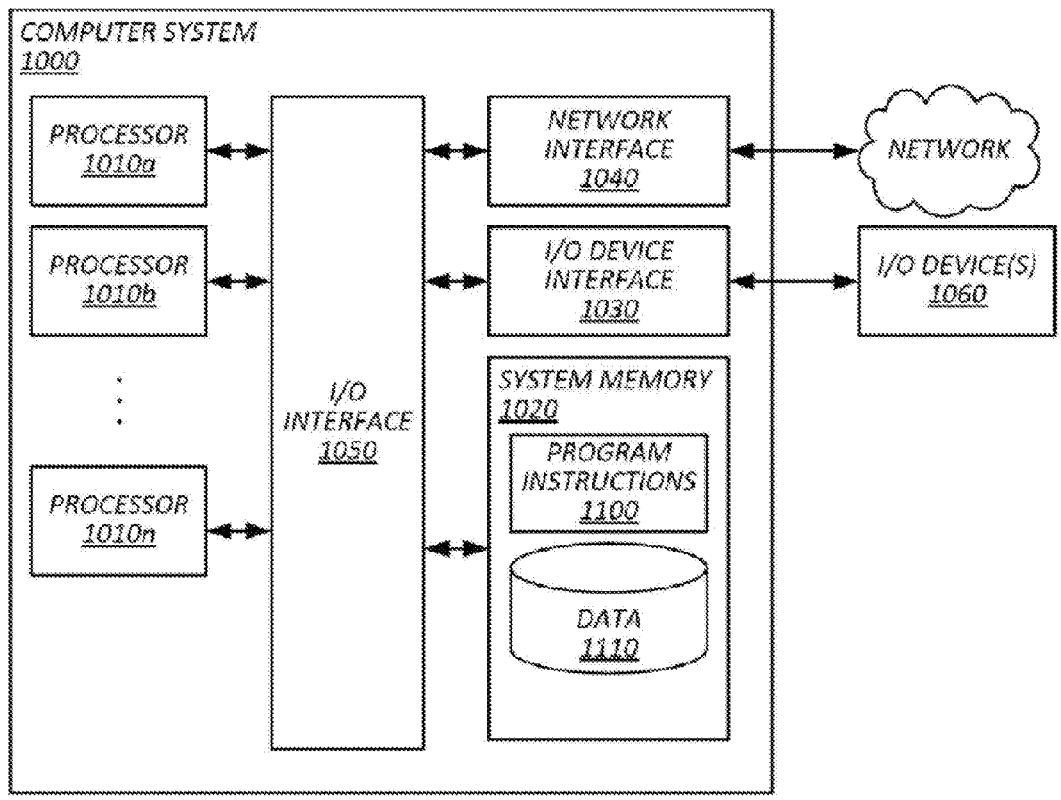
FIG. 7 is a block diagram of an example of a computer system by which the above-techniques may be implemented.

FIG. 7 is a diagram that illustrates an exemplary computer system 1000 in accordance with embodiments of the present technique. Various portions of systems and methods described herein, may include or be executed on one or more computer systems similar to computer system 1000. Further, processes and modules described herein may be executed by one or more processing systems similar to that of computer system 1000.

Computer system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computer system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on a remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference in this patent.

The present techniques will be better understood with reference to the following enumerated embodiments:

1. A method of summarizing a collection of documents in a corpus, the method comprising: obtaining a corpus comprising a plurality of document collections, wherein each of the document collections is associated with a plurality of features obtained from documents in the respective document collection; for a given document collection among the plurality of document collections, by one or more processors, computing a pertinence score for each of the plurality of features of the given document collection, wherein the pertinence score is indicative of pertinence of the respective feature to the given document collection relative to other document collections in the corpus; ranking, by one or more processors, the plurality of features of the given document collection based on the features' pertinence scores; selecting, by one or more processors, a plurality of highest ranked features from the ranked plurality of features of the given document collection to form a first set of selected features, wherein the first set of selected features are selected, at least in part, by determining a first coverage score for the first set of selected features is above a threshold, and wherein the first coverage score is indicative of coverage of documents in which the first set of selected features occur among the documents in the given document collection; re-ranking, by one or more processors, the first set of selected features based on the features' relevance to the given document collection; and selecting, by one or more processors, a plurality of highest re-ranked features from the first set of selected features to form a second set of selected features, wherein the second set of selected features are selected, at least in part, by determining a second coverage score for the second set of selected features is above the threshold, wherein the second coverage score is indicative of coverage of documents in which the second set of selected features occur among the documents in the given document collection, and wherein the second set of selected features are used for summarizing the document collection.

2. The method of embodiment 1, wherein obtaining a corpus comprises: retrieving each of documents in the corpus, the corpus having more than 1,000 documents with a median word length of more than 500 words; generating a feature vector for each of the retrieved documents, wherein the feature vector includes a plurality of n-grams in text of the document, a topic keyword describing content of the document, a document classification code, or a combination thereof; and clustering the retrieved documents into the plurality of document collections.

3. The method of any of embodiments 1 and 2, wherein computing a pertinence score for each of the plurality of features comprises: computing a first frequency in which the feature occurs in the given document collection; computing a second frequency in which the feature occurs in the other document collections in the corpus; and computing a product of the first frequency times the logarithm of the inverse of the second frequency to generate the pertinence score.

4. The method of any of embodiments 1-3, wherein selecting a plurality of highest ranked features comprises: for a given set of features with n consecutive highest pertinence scores, where n is a natural number, computing an amount of the number of documents in which the given set of features occur relative to the number of the documents in the given document collection; in response to determining the amount is above the threshold, selecting the given set of features; and in response to determining the amount is not above the threshold, updating the given set of features by adding another feature with the (n+1)th highest pertinence score and repeating the computing and determining operations.

5. The method of any of embodiments 1-4, wherein re-ranking the first set of selected features comprises: swapping rankings of first and second selected features in response to determining that a third coverage score for a third set of selected features including the first selected feature is smaller than a fourth coverage score for a fourth set of selected features including the second selected feature, and wherein the first selected feature is ranked higher than the second selected feature.

6. The method of embodiment 5, wherein the third set of selected features includes the first selected feature and one or more selected features with consecutive highest pertinence scores higher than the pertinence score of the first selected feature; and the fourth set of selected features includes the second selected feature and the one or more selected features with consecutive highest pertinence scores higher than the pertinence score of the first selected feature.

7. The method of embodiment 6, wherein the swapping operation is repeated for each pair of selected features ranked consecutively.

8. The method of any of embodiments 1-7, wherein selecting a plurality of highest re-ranked features comprises: for a given set of selected features with n consecutive highest pertinence scores, where n is a natural number, computing an amount of the number of documents in which the given set of selected features occur relative to the number of the documents in the given document collection; in response to determining the amount is above the threshold, selecting the given set of selected features; and in response to determining the amount is not above the threshold, updating the given set of selected features by adding another selected feature with the (n+1)th highest pertinence score and repeating the computing and determining operations.

9. The method of any of embodiments 1-8, wherein obtaining a corpus comprising a plurality of document collections comprises: performing steps for clustering documents; and performing steps for calculating feature vectors.

10. A system, comprising: one or more processors; and memory storing instructions that when executed by at least some of the processors effectuate operations comprising: obtaining a corpus comprising a plurality of document collections, wherein each of the document collections is associated with a plurality of features obtained from documents in the respective document collection; for a given document collection among the plurality of document collections, computing a pertinence score for each of the plurality of features of the given document collection, wherein the pertinence score is indicative of pertinence of the respective feature to the given document collection relative to other document collections in the corpus; ranking the plurality of features of the given document collection based on the features' pertinence scores; selecting a plurality of highest ranked features from the ranked plurality of features of the given document collection to form a first set of selected features, wherein the first set of selected features are selected, at least in part, by determining a first coverage score for the first set of selected features is above a threshold, and wherein the first coverage score is indicative of coverage of documents in which the first set of selected features occur among the documents in the given document collection; re-ranking the first set of selected features based on the features' relevance to the given document collection; and selecting a plurality of highest re-ranked features from the first set of selected features to form a second set of selected features, wherein the second set of selected features are selected, at least in part, by determining a second coverage score for the second set of selected features is above the threshold, wherein the second coverage score is indicative of coverage of documents in which the second set of selected features occur among the documents in the given document collection, and wherein the second set of selected features are used for summarizing the document collection.

11. The system of embodiment 10, wherein obtaining a corpus comprises: retrieving each of documents in the corpus, the corpus having more than 1,000 documents with a median word length of more than 500 words; generating a feature vector for each of the retrieved documents, wherein the feature vector includes a plurality of n-grams in text of the document, a topic keyword describing content of the document, a document classification code, or a combination thereof; and clustering the retrieved documents into the plurality of document collections.

12. The system of any of embodiments 10 and 11, wherein computing a pertinence score for each of the plurality of features comprises: computing a first frequency in which the feature occurs in the given document collection; computing a second frequency in which the feature occurs in the other document collections in the corpus; and computing a product of the first frequency times the logarithm of the inverse of the second frequency to generate the pertinence score.

13. The system of any of embodiments 10-12, wherein selecting a plurality of highest ranked features comprises: for a given set of features with n consecutive highest pertinence scores, where n is a natural number, computing an amount of the number of documents in which the given set of features occur relative to the number of the documents in the given document collection; in response to determining the amount is above the threshold, selecting the given set of features; and in response to determining the amount is not above the threshold, updating the given set of features by adding another feature with the (n+1)th highest pertinence score and repeating the computing and determining operations.

14. The system of any of embodiments 10-12, wherein re-ranking the first set of selected features comprises: swapping rankings of first and second selected features in response to determining that a third coverage score for a third set of selected features including the first selected feature is smaller than a fourth coverage score for a fourth set of selected features including the second selected feature, and wherein the first selected feature is ranked higher than the second selected feature.

15. The system of embodiment 14, wherein the third set of selected features includes the first selected feature and one or more selected features with consecutive highest pertinence scores higher than the pertinence score of the first selected feature; and the fourth set of selected features includes the second selected feature and the one or more selected features with consecutive highest pertinence scores higher than the pertinence score of the first selected feature.

16. The system of embodiment 15, wherein the swapping operation is repeated for each pair of selected features ranked consecutively.

17. The system of any of embodiments 10-16, wherein selecting a plurality of highest re-ranked features comprises: for a given set of selected features with n consecutive highest pertinence scores, where n is a natural number, computing an amount of the number of documents in which the given set of selected features occur relative to the number of the documents in the given document collection; in response to determining the amount is above the threshold, selecting the given set of selected features; and in response to determining the amount is not above the threshold, updating the given set of selected features by adding another selected feature with the (n+1)th highest pertinence score and repeating the computing and determining operations.

18. The system of any of embodiments 10-17, wherein obtaining a corpus comprising a plurality of document collections comprises: performing steps for clustering documents; and performing steps for calculating feature vectors.

19. A tangible, machine-readable, non-transitory medium storing instructions that when executed by a data processing apparatus, cause the data processing apparatus to perform operations comprising: obtaining a corpus comprising a plurality of document collections, wherein each of the document collections is associated with a plurality of features obtained from documents in the respective document collection; for a given document collection among the plurality of document collections, computing a pertinence score for each of the plurality of features of the given document collection, wherein the pertinence score is indicative of pertinence of the respective feature to the given document collection relative to other document collections in the corpus; ranking the plurality of features of the given document collection based on the features' pertinence scores; selecting a plurality of highest ranked features from the ranked plurality of features of the given document collection to form a first set of selected features, wherein the first set of selected features are selected, at least in part, by determining a first coverage score for the first set of selected features is above a threshold, and wherein the first coverage score is indicative of coverage of documents in which the first set of selected features occur among the documents in the given document collection; re-ranking the first set of selected features based on the features' relevance to the given document collection; and selecting a plurality of highest re-ranked features from the first set of selected features to form a second set of selected features, wherein the second set of selected features are selected, at least in part, by determining a second coverage score for the second set of selected features is above the threshold, wherein the second coverage score is indicative of coverage of documents in which the second set of selected features occur among the documents in the given document collection, and wherein the second set of selected features are used for summarizing the document collection.

What is claimed is:

1. A computer-implemented method of summarizing a collection of documents in a corpus, the method comprising:
    obtaining a corpus comprising a plurality of document collections, wherein each of the document collections is associated with a plurality of features obtained from documents in the respective document collection, each of the plurality of document collection having more than 100 documents, the plurality of features comprising n-grams, topic keywords, document classification codes, or a combination thereof;
    for a given document collection among the plurality of document collections, computing, by one or more processors, a pertinence score for each of the plurality of features of the given document collection, wherein the pertinence score is indicative of pertinence of the respective feature to the given document collection relative to other document collections in the corpus;
    ranking, by one or more processors, the plurality of features of the given document collection based on the features' pertinence scores;
    selecting, by one or more processors, a plurality of highest ranked features from the ranked plurality of features of the given document collection to form a first set of selected features, wherein the first set of selected features are selected, at least in part, by determining a first coverage score for the first set of selected features is above a threshold, and wherein the first coverage score is indicative of coverage of documents in which the first set of selected features occur among the documents in the given document collection, wherein selecting a plurality of highest ranked features comprises:
        (i) for a given set of features with n consecutive highest pertinence scores, where n is a natural number, computing an amount of the number of documents in which the given set of features occur relative to the number of the documents in the given document collection; and
        (ii) in response to determining the amount is above the threshold, selecting the given set of features; and in response to determining the amount is not above the threshold, updating the given set of features by adding another feature with the (n+1)th highest pertinence score and repeating the computing and determining operations (i) and (ii) at least once;
    re-ranking, by one or more processors, the first set of selected features based on the features' relevance to the given document collection; and
    selecting, by one or more processors, a plurality of highest re-ranked features from the first set of selected features to form a second set of selected features, wherein the second set of selected features are selected, at least in part, by determining a second coverage score for the second set of selected features is above the threshold, wherein the second coverage score is indicative of coverage of documents in which the second set of selected features occur among the documents in the given document collection, and wherein the second set of selected features are used for summarizing the document collection.

2. The method of claim 1, wherein obtaining a corpus comprises:
    retrieving each of documents in the corpus, the corpus having more than 1,000 documents with a median word length of more than 500 words;
    generating a feature vector for each of the retrieved documents, wherein the feature vector includes a plurality of n-grams in text of the document, a topic keyword describing content of the document, a document classification code, or a combination thereof; and
    clustering the retrieved documents into the plurality of document collections.

3. The method of claim 1, wherein computing a pertinence score for each of the plurality of features comprises:
    computing a first frequency in which the feature occurs in the given document collection;

computing a second frequency in which the feature occurs in the other document collections in the corpus; and computing a product of the first frequency times the logarithm of the inverse of the second frequency to generate the pertinence score.

4. The method of claim 1, wherein re-ranking the first set of selected features comprises:

swapping rankings of first and second selected features in response to determining that a third coverage score for a third set of selected features including the first selected feature is smaller than a fourth coverage score for a fourth set of selected features including the second selected feature, and wherein the first selected feature is ranked higher than the second selected feature.

5. The method of claim 4, wherein the third set of selected features includes the first selected feature and one or more selected features with consecutive highest pertinence scores higher than the pertinence score of the first selected feature; and the fourth set of selected features includes the second selected feature and the one or more selected features with consecutive highest pertinence scores higher than the pertinence score of the first selected feature.

6. The method of claim 5, wherein the swapping operation is repeated for each pair of selected features ranked consecutively.

7. The method of claim 1, wherein obtaining a corpus comprising a plurality of document collections comprises:

performing steps for clustering documents; and performing steps for calculating feature vectors.

8. A computer-implemented method of summarizing a collection of documents in a corpus, the method comprising:

obtaining a corpus comprising a plurality of document collections, wherein each of the document collections is associated with a plurality of features obtained from documents in the respective document collection, each of the plurality of document collection having more than 100 documents, the plurality of features comprising n-grams, topic keywords, document classification codes, or a combination thereof;

for a given document collection among the plurality of document collections, computing, by one or more processors, a pertinence score for each of the plurality of features of the given document collection, wherein the pertinence score is indicative of pertinence of the respective feature to the given document collection relative to other document collections in the corpus;

ranking, by one or more processors, the plurality of features of the given document collection based on the features' pertinence scores;

selecting, by one or more processors, a plurality of highest ranked features from the ranked plurality of features of the given document collection to form a first set of selected features, wherein the first set of selected features are selected, at least in part, by determining a first coverage score for the first set of selected features is above a threshold, and wherein the first coverage score is indicative of coverage of documents in which the first set of selected features occur among the documents in the given document collection;

re-ranking, by one or more processors, the first set of selected features based on the features' relevance to the given document collection; and selecting, by one or more processors, a plurality of highest re-ranked features from the first set of selected features to form a second set of selected features, wherein the second set of selected features are selected, at least in part, by determining a second coverage score for the second set of selected features is above the threshold, wherein the second coverage score is indicative of coverage of documents in which the second set of selected features occur among the documents in the given document collection, and wherein the second set of selected features are used for summarizing the document collection, wherein selecting a plurality of highest re-ranked features comprises:

(i) for a given set of selected features with n consecutive highest pertinence scores, where n is a natural number, computing an amount of the number of documents in which the given set of selected features occur relative to the number of the documents in the given document collection; and (ii) in response to determining the amount is above the threshold, selecting the given set of selected features; and in response to determining the amount is not above the threshold, updating the given set of selected features by adding another selected feature with the (n+1)th highest pertinence score and repeating the computing and determining operations (i) and (ii) at least once.

9. A system, comprising:

one or more processors; and memory storing instructions that when executed by at least some of the processors effectuate operations comprising:

obtaining a corpus comprising a plurality of document collections, wherein each of the document collections is associated with a plurality of features obtained from documents in the respective document collection, the plurality of features comprising n-grams, topic keywords, document classification codes, or a combination thereof;

for a given document collection among the plurality of document collections, computing a pertinence score for each of the plurality of features of the given document collection, wherein the pertinence score is indicative of pertinence of the respective feature to the given document collection relative to other document collections in the corpus;

ranking the plurality of features of the given document collection based on the features' pertinence scores;

selecting a plurality of highest ranked features from the ranked plurality of features of the given document collection to form a first set of selected features, wherein the first set of selected features are selected, at least in part, by determining a first coverage score for the first set of selected features is above a threshold, and wherein the first coverage score is indicative of coverage of documents in which the first set of selected features occur among the documents in the given document collection, wherein selecting a plurality of highest ranked features comprises:

(i) for a given set of features with n consecutive highest pertinence scores, where n is a natural number, computing an amount of the number of documents in which the given set of features occur relative to the number of the documents in the given document collection; and (ii) in response to determining the amount is above the threshold, selecting the given set of features; and in response to determining the amount is not above the threshold, updating the given set of features by adding another feature with the (n+1)

th highest pertinence score and repeating the computing and determining operations (i) and (ii) at least once;

re-ranking the first set of selected features based on the features' relevance to the given document collection; and selecting a plurality of highest re-ranked features from the first set of selected features to form a second set of selected features, wherein the second set of selected features are selected, at least in part, by determining a second coverage score for the second set of selected features is above the threshold, wherein the second coverage score is indicative of coverage of documents in which the second set of selected features occur among the documents in the given document collection, and wherein the second set of selected features are used for summarizing the document collection.

10. The system of claim 9, wherein obtaining a corpus comprises:

retrieving each of documents in the corpus, the corpus having more than 1,000 documents with a median word length of more than 500 words;

generating a feature vector for each of the retrieved documents, wherein the feature vector includes a plurality of n-grams in text of the document, a topic keyword describing content of the document, a document classification code, or a combination thereof; and clustering the retrieved documents into the plurality of document collections.

11. The system of claim 9, wherein computing a pertinence score for each of the plurality of features comprises:

computing a first frequency in which the feature occurs in the given document collection;

computing a second frequency in which the feature occurs in the other document collections in the corpus; and computing a product of the first frequency times the logarithm of the inverse of the second frequency to generate the pertinence score.

12. The system of claim 9, wherein re-ranking the first set of selected features comprises:

swapping rankings of first and second selected features in response to determining that a third coverage score for a third set of selected features including the first selected feature is smaller than a fourth coverage score for a fourth set of selected features including the second selected feature, and wherein the first selected feature is ranked higher than the second selected feature.

13. The system of claim 12, wherein the third set of selected features includes the first selected feature and one or more selected features with consecutive highest pertinence scores higher than the pertinence score of the first selected feature; and the fourth set of selected features includes the second selected feature and the one or more selected features with consecutive highest pertinence scores higher than the pertinence score of the first selected feature.

14. The system of claim 13, wherein the swapping operation is repeated for each pair of selected features ranked consecutively.

15. The system of claim 9, wherein obtaining a corpus comprising a plurality of document collections comprises:

performing steps for clustering documents; and performing steps for calculating feature vectors.

16. A system, comprising:

one or more processors; and memory storing instructions that when executed by at least some of the processors effectuate operations comprising:

obtaining a corpus comprising a plurality of document collections, wherein each of the document collections is associated with a plurality of features obtained from documents in the respective document collection, the plurality of features comprising n-grams, topic keywords, document classification codes, or a combination thereof;

for a given document collection among the plurality of document collections, computing a pertinence score for each of the plurality of features of the given document collection, wherein the pertinence score is indicative of pertinence of the respective feature to the given document collection relative to other document collections in the corpus;

ranking the plurality of features of the given document collection based on the features' pertinence scores;

selecting a plurality of highest ranked features from the ranked plurality of features of the given document collection to form a first set of selected features, wherein the first set of selected features are selected, at least in part, by determining a first coverage score for the first set of selected features is above a threshold, and wherein the first coverage score is indicative of coverage of documents in which the first set of selected features occur among the documents in the given document collection;

re-ranking the first set of selected features based on the features' relevance to the given document collection; and selecting a plurality of highest re-ranked features from the first set of selected features to form a second set of selected features, wherein the second set of selected features are selected, at least in part, by determining a second coverage score for the second set of selected features is above the threshold, wherein the second coverage score is indicative of coverage of documents in which the second set of selected features occur among the documents in the given document collection, and wherein the second set of selected features are used for summarizing the document collection, wherein selecting a plurality of highest re-ranked features comprises:

(i) for a given set of selected features with n consecutive highest pertinence scores, where n is a natural number, computing an amount of the number of documents in which the given set of selected features occur relative to the number of the documents in the given document collection; and (ii) in response to determining the amount is above the threshold, selecting the given set of selected features; and in response to determining the amount is not above the threshold, updating the given set of selected features by adding another selected feature with the (n+1)th highest pertinence score and repeating the computing and determining operations (i) and (ii) at least once.

* * * * *